United States Patent [19]

Gollan

[11] E Patent Number: Re. 33,502

[45] Reissued Date of Patent: Dec. 25, 1990

[54] GAS SEPARATING

[75] Inventor: Arye Z. Gollan, Newton, Mass.

[73] Assignee: A/G Technology Corporation, Needham, Mass.

[21] Appl. No.: 286,367

[22] Filed: Dec. 19, 1988

Related U.S. Patent Documents

Reissue of:

[64] Patent No.: 4,734,106
Issued: Mar. 29, 1988
Appl. No.: 731,992
Filed: May 8, 1985

[51] Int. Cl.[5] ..... B01D 53/22

[52] U.S. Cl. ..... 55/16; 55/68; 55/158

[58] Field of Search ..... 55/16, 68, 158

[56] References Cited

U.S. PATENT DOCUMENTS

| | | | |
|---|---|---|---|
| 3,245,206 | 4/1966 | Bonnet | 55/158 |
| 3,246,764 | 4/1966 | McCormack | 55/158 X |
| 3,252,272 | 5/1966 | Hazen et al. | 55/158 |
| 3,274,750 | 9/1966 | Robb | 55/16 |
| 3,509,694 | 5/1970 | Imai et al. | 55/16 |
| 3,832,830 | 9/1974 | Gerow | 55/158 |
| 4,083,780 | 4/1978 | Call | 210/433.2 X |
| 4,119,417 | 10/1978 | Heki et al. | 55/158 |
| 4,140,499 | 2/1979 | Ozaki et al. | 55/158 |
| 4,171,017 | 10/1979 | Klass | 55/16 X |
| 4,180,552 | 12/1979 | Graham et al. | 55/16 X |
| 4,180,553 | 12/1979 | Null et al. | 55/16 X |
| 4,220,535 | 9/1980 | Leonard | 55/158 X |
| 4,230,463 | 10/1980 | Henis et al. | 55/16 |
| 4,308,654 | 1/1982 | Bogart | 55/16 X |
| 4,329,157 | 5/1982 | Dobo et al. | 55/16 |
| 4,568,579 | 12/1986 | Watson | 55/158 X |

FOREIGN PATENT DOCUMENTS

| | | | |
|---|---|---|---|
| 204424 | 12/1986 | European Pat. Off. | 55/158 |
| 119420 | 9/1980 | Japan | 55/16 |
| 127124 | 10/1980 | Japan | 55/16 |
| 2022457 | 12/1979 | United Kingdom | 55/16 |
| 2040723 | 9/1980 | United Kingdom | 55/158 |
| 2122103 | 1/1984 | United Kingdom | 55/158 |

OTHER PUBLICATIONS

Review Article, No. 13, "Chemical Engineering Science", vol. 38, No. 4, pp. 503–524 (1983), entitled Separation of Gases with Synthetic Membranes.

"Recent Developments in Separation Science", vol. II (1972).

"Ind. Eng. Chem., Process Des. Dev.", vol. 16, No. 4 (1977), entitled Analysis of Gas Separation by Permeation in Hollow Fibers.

C. Y. Pan, "Gas Separation by Permeators with High--Flux Asymmetric Membranes", AIChE Journal (vol. 29, No. 4), Jul., 1983, pp. 545–552.

*Primary Examiner*—Robert Spitzer
*Attorney, Agent, or Firm*—Fish & Richardson

[57] ABSTRACT

Feed gas is directed tangentially along the non-skin surface of gas separation membrane modules comprising a cylindrical bundle of parallel contiguous hollow fibers supported to allow feed gas to flow from an inlet at one end of a cylindrical housing through the bores of the bundled fibers to an outlet at the other end while a component of the feed gas permeates through the fibers, each having the skin side on the outside, through a permeate outlet in the cylindrical casing.

7 Claims, 1 Drawing Sheet

GAS SEPARATING

Matter enclosed in heavy brackets [ ] appears in the original patent but forms no part of this reissue specification; matter printed in italics indicates the additions made by reissue.

This invention was made with Government support under Contract No. DE-A-AC07-83ID12429 awarded by the Department of Energy. The Government has certain rights in this invention.

The present invention relates in general to gas separating and more particularly concerns novel apparatus and techniques for advantageously using membrane systems for separation through an especially convenient approach that facilitates using a less costly membrane cartridge structure to attain a given degree of separation.

A typical membrane system comprises a hollow tubular membrane having a porous side inside and a membrane separating skin on the outside. A problem with prior art membrane systems for liquid/solute separations, such as reverse osmosis (RO) or ultrafiltration (UF), results from a phenomenon known as "concentration polarization" which results in an increased concentration of the species to be separated at the separating layer (membrane "skin"). This increase in concentration tends to reduce the permeation rate of permeable species across the membrane and to reduce the degree of separation possible. To reduce "concentration polarization" in liquid/solute systems, it has been essential to sweep the feed stream tangentially past the separating membrane layer at sufficient velocities to induce mass transfer of retained component away from the membrane skin and into the bulk feed stream. Introducing feed streams from the side opposite the skin side aggravates concentration polarization by forming an additional, essentially stagnant, layer presented by the fluid inside the porous backing through which solute to be separated is transported predominantly by diffusion.

This same mode of operation has been adopted in gas separations with membranes; that is, maintaining the feed gas stream on the "skin" side of the membrane to reduce polarization. An example of this type of system is disclosed in U.S. Pat. No. 4,329,157 and illustrated in FIG. 7 thereof.

For hollow fiber membrane geometry, the skin side of the membrane may be either on the inside or the outside of the fiber. Technically, it is far easier and generally less expensive (and more common commercially) to cast a so-called asymmetric membrane with an integral skin or a composite coating on the outside of the fiber. Most, if not all, commercially available membrane gas separation systems with asymmetric or composite membranes flow the feed gas on the skin side of the membranes in an effort to prevent or reduce concentration polarization. For hollow fibers with outside skins, this approach requires flowing the feed gas on the outside of the fiber bundle as disclosed in the aforesaid patent.

Uniform flow of the feed gas on the outside of the membrane fibers is more difficult to achieve compared with inside flow and results in sometimes elaborate schemes for prevention of dead spots and maintenance of good, even flow distribution.

It is an important object of this invention to provide improved apparatus and techniques for gas separation with membrane modules.

According to the invention, feed gas flow sweeps the membrane tangentially along the side opposite the separating "skin" side. In a specific cocurrent flow arrangement of the apparatus, a hollow tubular membrane having its skin side on the outside circumference is open at both ends and is seated in a cylindrical housing having an opening at one end for receiving feed gas, an opening at the other end for delivering a gas component, and near the other end in the circumferential wall, a third opening for passing the permeated component that diffuses through the membrane.

According to an aspect of the invention of countercurrent flow arrangement, membranes may be confined to develop a flow of diffusate in a direction opposite the flow of the feedgas for withdrawal through an opening in the casing. The casing may be flexible to reduce weight or conform to an available shape and need not be a pressure vessel.

Numerous other features, objects and advantages of the invention will become apparent from the following specification when read in connection with the accompanying drawing in which.

Figure 1:
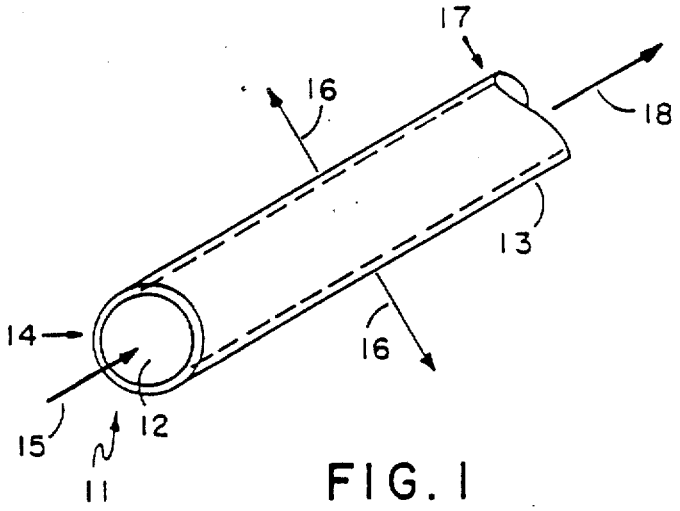
FIG. 1 is a fragmentary veiw of a single hollow fiber with gas flow through the bore and the separating skin layer on the outside of the lumen.

With reference to the drawing and more particularly FIG. 1 there is shown a fragmentary view of a single hollow fiber with gas flow through the bore and separating skin layer on the outside of the lumen. Fiber 11 has a wall surrounding lumen 12 and a skin 13 on the circumferential surface of fiber 11. Feed gas having components to be separated enter lumen 12 in fiber 11 at end 14 as indicated by arrow 15. Permeate diffuses through the wall of tube 11 and its outside skin 13 to produce a permeate flow of a component separated from the feed gas transverse to the tube axis as indicated by arrows 16. Reject exits at end 17 of hollow fiber 11 along the direction indicated by arrow 18.

It has been discovered surprisingly and in conflict with general expectations based on observations of prior art liquid/solute membrane separation systems that concentration polarization is not aggravated, and feed gas flow on the membrane side opopsite the skin separating layer has no detrimental effect on system performance. This property is believed to result from the exceptionally high interdiffusion of gases at the separation barrier back into the bulk stream in gas separation via membranes and because the prevailing economical mass flux levels are generally significantly lower than in liquid separation systems.

Figure 2:
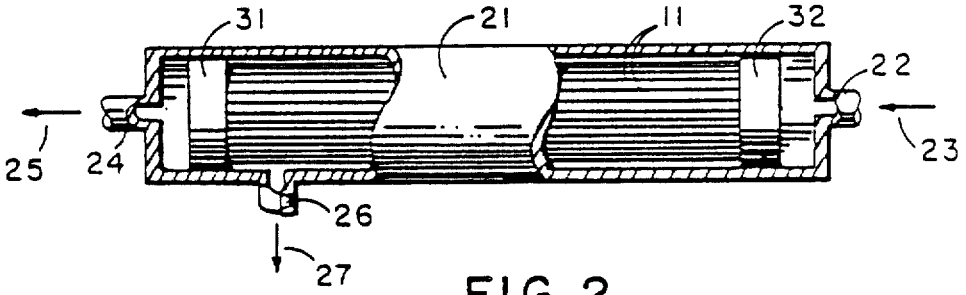
FIG. 2 is a view, partially in section, of a system according to the invention comprising a number of cocurrent parallel hollow fibers in a gas separating system.

Referring to FIG. 2, there is shown a view partially in section of a gas separation membrane system according to the invention. A cylindrical housing 21 has an axial inlet 22 at one end for receiving feed gas flowing as indicated by arrow 23, an axial outlet 24 at the opposite end for discharging reject along the flow direction indicated by arrow 25 and a transverse outlet 26 for ejecting permeate along the transverse flow direction indicated by arrow 27. Housing 21 includes a cartridge of hollow fibers 11. Hollow fibers 11 are supported in exit and entrance headers 31 and 32 annularly sealed against the inside wall of housing 21 so that essentially the only fluid communication through the headers are through the bores of the hollow fibers 11. The cartridge of hollow fiber 11 may be encased in an impervious cover, such as a mylar film, anchored in header 32 and open opposite outlet 27 to promote cocurrent flow. This approach is structurally different from the prior art, such as exemplified in FIG. 7 of U.S. Pat. No. 4,329,157, which expressly teaches that fibers are imbedded in the header at the feed end so as to block the feed end openings of the fibers. This blocking is essential to the prior art approach of having the feed gas flow along the outside skin of the fibers.

With the prior art system, if the feed pressure is greater than atmospheric pressure, the fibers must be housed in a pressure vessel. With the present invention, a pressure vessel is not required, and the casing may be flexible to reduce weight or conform to available shape. *As seen in FIG. 1 fiber 11 is free of being encased in a tubular member that provides rigidity and strength. The outside skin 13 remains intact although in tension in response to the feed gas stream being directed along the inside of the tubes without the need of an adjacent member to provide ridigity and strength.*

Figure 3:
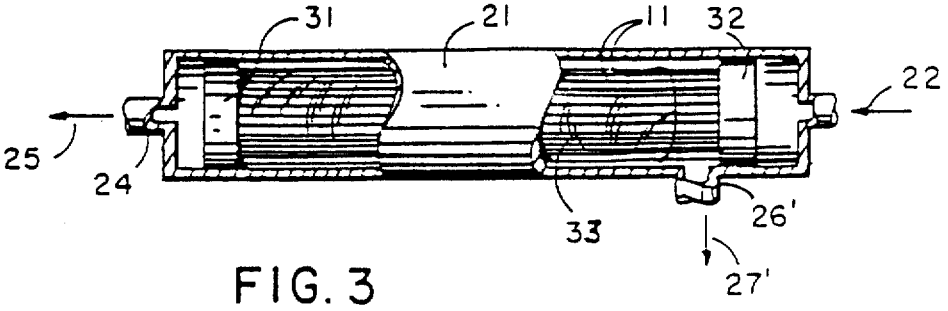
FIG. 3 is a view, partially in section, of a countercurrent system according to the invention.

Referring to FIG. 3, there is shown an alternative embodiment of the invention that is a countercurrent flow system. Corresponding elements are identified by the same reference symbols in FIGS. 2 and 3. The structure of the embodiment of FIG. 3 is similar to that of FIG. 2 except that hollow fibers 11 are encased in a impervious cover, such as mylar sleeve 33, that is sealed at the end against header 31 and open at the end facing header 32 so that permeate exits through outlet 26' along the direction of arrow 27'.

The invention has a number of advantages. Cartridge design fabrication is relatively simple and a part of a less expensive system. When operating in a pressure mode, the casing need not be designed for as high a pressure as when directing the feed gas along the outside skin. The outside skin remains intact although in tension in response to the feed gas stream being directed along the inside of the tubes. Countercurrent flow is more readily achieved.

It is also within the principles of the invention to use a liquid membrane. Furthermore, the membrane need not be straight so that the reject could exit on the same side of the casing as the feed enters. To verify that it is practical to feed on the non-skid side; that is, on the inside of the fibers, experiments were conducted using air feed to cartridges at 10 psig and 10% conversion. The effective permeability data listed in the following table setting forth these results were temperature corrected to 77° F.

| Feed Flow | Feed to Permeate Flow | Selectivity | Effective Permeability $cm^3$ (STP)/$cm^2$ sec cm-Hg |
|---|---|---|---|
| Inside | Co-current | 2.76 | 1.42 × 10E-4 |
| Outside | Co-current | 2.72 | 1.46 × 10E-4 |
| Inside | Counter-current | 2.97 | 1.58 × 10E-4 |
| Outside | Counter-current | 3.01 | 1.61 × 10E-4 |

Thus, operation with the feed on the non-skin side through the bores of the fiber produces essentially identical results to operation with the feed on the skin side; that is, outside the fibers. And countercurrent flow provides better cartridge overall aperture selectivity than cocurrent flow.

While the invention has been described in connection with tubes, it is within the principles of the invention to use membranes of other configurations. For example, plate membranes might be used with feed gas flow through opposed pairs of membranes between the non-skin side of each membrane in a pair. The feed-flow may be effected by having a pressure above atmospheric at the feed end or below atmospheric at the exit end, or combinations thereof.

There has been described novel apparatus and techniques for gas separation using membrane modules characterized by numerous advantages, including ease of obtaining a given degree of separation with relatively inexpensive modules capable of operating satisfactorily over relatively long periods of time. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A method of gas separating with *asymmetric* membranes having a skin side and a non-skin side *free of a member adjacent to said skin that provides rigidity and strength* which method includes the steps of, directing a feed gas having a plurality of components tangentially along the non-skin side of said *asymmetric* membrane to cause a component of said feed gas to permeate through said *asymmetric* membrane, and withdrawing the permeated gas component.

2. A method in accordance with claim 1 wherein said *asymmetric* membrane comprises a hollow fiber having a central bore with the skin side being on the outside of said fiber and non-skin side being on the bore side thereof wherein said step of directing said feed gas includes directing said feed gas through the bore in said hollow fiber.

3. A method in accordance with claim 2 wherein said *asymmetric* membrane includes a plurality of contiguous hollow fibers and said step of directing feed gas tangentially along the non-skin side includes directing said feed gas through the bores in said contiguous fibers.

4. Apparatus for practicing the method of claim 1 comprising, casing means for supporting said *asymmetric* membranes *each free of a member adjacent to the skin side for providing rigidity and strength* and having an inlet for receiving said feed gas, and at least first and second outlets for expelling said permeated component and a rejected component respectively, and means for supporting said *asymmetric* membranes for presenting a passage from said inlet along said non-skin side to said second outlet.

5. Apparatus in accordance with claim 4 wherein said *asymmetric* membrane comprises a plurality of contiguous hollow fibers each having a bore, means at each end of said bundle of fibers for supporting said fibers in said casing to allow feed gas to flow through the fiber bores from said inlet to said second outlet.

6. Apparatus in accordance with claim 4 and further comprising, means for supporting said *asymmetric* membranes to establish countercurrent flow of said permeated component relative to the flow of said feed gas.

7. Apparatus in accordance with claim 5 and further comprising, means for encasing said contiguous hollow fibers for establishing countercurrent flow of said permeated component relative to the flow of said feed gas through said bores.

* * * * *